(12) United States Patent
Pretty (10) Patent No.: US 11,525,372 B2
(45) Date of Patent: Dec. 13, 2022

(54) DIAPHRAGM LATCH

(71) Applicant: ROHR, INC., Chula Vista, CA (US)

(72) Inventor: Michael Sean Pretty, Jamul, CA (US)

(73) Assignee: Rohr, Inc., Chula Vista, CA (US)

( * ) Notice: Subject to any disclaimer, the term of this patent is extended or adjusted under 35 U.S.C. 154(b) by 856 days.

(21) Appl. No.: 15/937,700

(22) Filed: Mar. 27, 2018

(65) Prior Publication Data

US 2019/0301305 A1 Oct. 3, 2019

(51) Int. Cl.
| | |
|---|---|
| *F01D 25/26* | (2006.01) |
| *E05B 51/02* | (2006.01) |
| *F15B 15/10* | (2006.01) |
| *B64D 29/06* | (2006.01) |
| *E05C 19/06* | (2006.01) |

(52) U.S. Cl.
CPC .......... *F01D 25/265* (2013.01); *B64D 29/06* (2013.01); *E05B 51/023* (2013.01); *E05C 19/06* (2013.01); *F05D 2240/14* (2013.01); *F05D 2260/30* (2013.01); *F05D 2270/09* (2013.01); *F05D 2270/42* (2013.01); *F15B 15/10* (2013.01)

(58) Field of Classification Search
CPC ........ E05B 51/023; E05B 51/00; E05B 51/02; E05B 2051/026; E05C 19/06; F16B 15/10; F16J 3/00; F02K 1/766; F02K 1/80; F15B 15/10
See application file for complete search history.

(56) References Cited

U.S. PATENT DOCUMENTS

| | | | | |
|---|---|---|---|---|
| 9,458,648 | B1 * | 10/2016 | Neal | E05B 51/02 |
| 9,567,774 | B1 * | 2/2017 | Neal | E05B 51/02 |
| 9,708,073 | B2 | 7/2017 | Pretty et al. | |
| 10,155,580 | B1 * | 12/2018 | Neal | F16B 21/165 |
| 10,507,932 | B2 * | 12/2019 | Pretty | B64D 29/08 |
| 10,508,566 | B2 * | 12/2019 | Linde | B64D 29/06 |
| 2011/0014044 | A1 * | 1/2011 | Vauchel | B64D 29/06 |
| | | | | 415/214.1 |
| 2012/0097261 | A1 * | 4/2012 | Porte | B64D 29/08 |
| | | | | 137/15.1 |

(Continued)

FOREIGN PATENT DOCUMENTS

| | | | | |
|---|---|---|---|---|
| DE | 2550898 A1 * | 5/1977 | | F15B 15/10 |
| FR | 1394542 A * | 4/1965 | | E05B 51/02 |

(Continued)

OTHER PUBLICATIONS

Computer Generated Translation for DE 2550898 A1, Generated on Jan. 8, 2021, https://worldwide.espacenet.com/ (Year: 2021).*

(Continued)

*Primary Examiner* — Alyson M Merlino
(74) *Attorney, Agent, or Firm* — Snell & Wilmer L.L.P.

(57) ABSTRACT

A diaphragm latch may comprise a housing, a diaphragm disposed in the housing, a pin coupled to the diaphragm, an opening in the housing, and a pin aperture disposed in the first side, wherein the pin extends from the pin aperture. The diaphragm may be configured to move in response to a pressure being communicated through the opening, and the pin may be configured to at least one of extend or retract from the pin aperture in response to the diaphragm moving. The diaphragm latch may passively couple an inner fixed structure (IFS) to an intermediate case (IMC) during an overpressure event.

12 Claims, 9 Drawing Sheets

(56) References Cited

U.S. PATENT DOCUMENTS

| | | |
|---|---|---|
| 2015/0308168 A1 | 10/2015 | Pretty |
| 2016/0032779 A1 | 2/2016 | Sawyers-Abbott |
| 2016/0245226 A1 | 8/2016 | Brown |
| 2016/0281539 A1 | 9/2016 | Linde et al. |
| 2018/0238355 A1* | 8/2018 | Zabielski ................ F15B 15/10 |

FOREIGN PATENT DOCUMENTS

| | | | | |
|---|---|---|---|---|
| GB | 191017661 A | * | 5/1911 | ............. E05B 51/02 |
| GB | 191419959 A | * | 3/1915 | ............. E05B 51/02 |

OTHER PUBLICATIONS

Computer Generated Translation for DE2550898, Generated on Dec. 8, 2021, https://worldwide.espacenet.com/ (Year: 2021).*

* cited by examiner

DIAPHRAGM LATCH

FIELD

The present disclosure relates to latch assemblies capable of being used in an aircraft nacelle, and more particularly to a latch between the leading edge of an inner fixed structure of a propulsion system thrust reverser and the engine case.

BACKGROUND

A bypass duct of a nacelle may be disposed about a gas turbine engine. The bypass duct may be at least partially defined by an inner fixed structure (IFS) of a thrust reverser. Under certain conditions, an overpressure event underneath the IFS may cause the IFS to deflect in a radially outward direction with respect to the gas turbine engine. If the leading edge of the IFS deflects enough into the bypass duct, it will begin to scoop the high velocity air within the duct, which will result in a further increase of forces and additional deflection. Such deflection, if extreme, may damage the IFS and jeopardize its integrity.

SUMMARY

A diaphragm latch is disclosed, comprising a housing defining an opening, a diaphragm disposed in the housing, a pin coupled to the diaphragm, and a pin aperture disposed in the housing, wherein the pin extends from the pin aperture, wherein the diaphragm is configured to flex in response to an increased air pressure being communicated through the opening, and the pin is configured to at least one of extend or retract from the pin aperture in response to the diaphragm flexing.

In various embodiments, the housing comprises a first side and a second side, wherein the first side is disposed opposite the diaphragm from the second side.

In various embodiments, the pin aperture is disposed on the first side, and the opening in disposed on the second side.

In various embodiments, the diaphragm is made from a metal.

In various embodiments, the diaphragm is coupled between the first side of the housing and the second side of the housing.

In various embodiments, the diaphragm latch further comprises a second opening disposed in the second side of the housing.

In various embodiments, the pin is coupled to a center of the diaphragm.

In various embodiments, the diaphragm latch further comprises a second pin aperture disposed on the second side, wherein a first end of the pin extends through the pin aperture and a second end of the pin extends through the second pin aperture.

A method for passively coupling an inner fixed structure (IFS) to an intermediate case (IMC) during an overpressure event is disclosed, comprising receiving, by a diaphragm latch, a pressurized gas from a core compartment, moving, by a diaphragm, with respect to a housing of the diaphragm latch in response to the pressurized gas being received, extending, by a pin, from the housing in response to the moving, and receiving, by a receptacle, the pin in response to the pin extending from the housing.

In various embodiments, the method further comprises forming a load path between the IFS and the IMC in response to the pin being received by the receptacle.

In various embodiments, the diaphragm is coupled to the housing and the pin is coupled to the diaphragm and moves with the diaphragm.

A latch arrangement is disclosed, comprising a receptacle coupled to an intermediate case (IMC), and a diaphragm latch coupled to an inner fixed structure (IFS), comprising, a housing, a diaphragm disposed in the housing, a pin coupled to the diaphragm, an opening in the housing, and a pin aperture disposed in the first side, wherein the pin extends from the pin aperture, wherein the diaphragm is configured to flex in response to a pressure being communicated through the opening, and the pin is configured to at least one of extend and retract from the pin aperture in response to the diaphragm flexing.

In various embodiments, the diaphragm latch is disposed radially inwards from the IFS.

In various embodiments, the diaphragm is coupled to a leading edge of the IFS.

In various embodiments, the pin is received by the receptacle in response to the pin extending from the pin aperture.

In various embodiments, the latch arrangement mitigates movement of the leading edge of the IFS relative to the IMC in response to the pin being received by the pin aperture.

In various embodiments, the diaphragm latch is disposed in a core compartment.

In various embodiments, the diaphragm is configured to flex in response to the pressure of the core compartment increasing.

In various embodiments, the diaphragm moves towards a first side of the housing in response to the pressure increasing.

In various embodiments, the diaphragm moves towards a second side of the housing in response to the pressure decreasing.

In various embodiments, the latch arrangement may further comprise a tube extending between the IFS and the diaphragm latch, whereby the diaphragm latch is in fluidic communication with a bypass flow path.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, material, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "outboard" may define an element or portion of an element that is situated radially outer to or away from another, radially inward, element or portion of an element. Thus, an engine core may be situated radially inboard of an inner fixed structure ("IFS") and/or a fan casing, as described herein. As used herein, "inboard" may define the element or portion of the element that is situated radially inward in relation to an outboard element.

Figure 1:
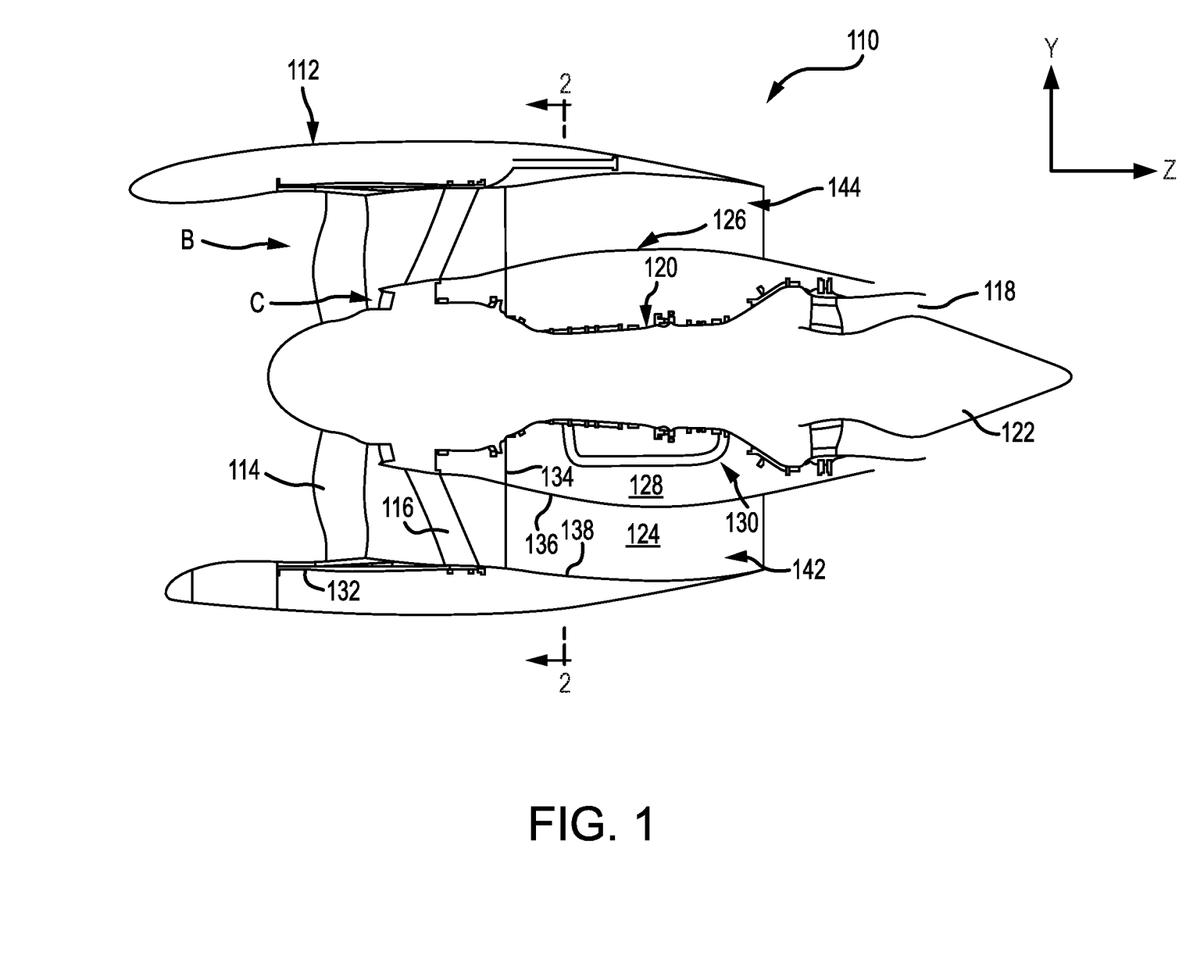
FIG. 1 illustrates a schematic view of a gas turbine engine, in accordance with various embodiments.

According to various embodiments, FIG. 1 illustrates a schematic sectional view of a gas turbine engine. Gas turbine engine 110 may include core engine 120. Core air flow C flows through core engine 120 and is expelled through exhaust outlet 118 surrounding exhaust centerbody 122.

Core engine 120 drives a fan 114 arranged in a bypass flow path 124. Bypass air flow B, driven by the fan 114, flows in the aft direction through bypass flow path 124. At least a portion of bypass flow path 124 may be defined by nacelle structure 112 and inner fixed structure (IFS) 126. As is known, the general shape of IFS 126 is a surface of revolution around the engine axis, often with two bifurcation panels at the six o'clock and the twelve o'clock position which extend radially outward, and the IFS is often made from two generally mirror image halves that hinge together as part of the thrust reverser structure. The radially-outboard surface of IFS 126 may be referred to as an inner flow surface 136 of the bypass flow path 124, and the radially-inboard surface of nacelle structure 112 may be referred to as an outer flow surface 138 of the bypass flow path 124. Fan case 132 may surround fan 114. Fan case 132 may be housed within nacelle structure 112.

In various embodiments, an intermediate case (IMC) 134 of the gas turbine engine 110 may be provided radially inward of fan case 132. Fan case 132 may provide mounting structure for securing gas turbine engine 110 to a pylon. IMC 134 may be surrounded by nacelle structure 112. According to various embodiments, multiple guide vanes 116 may extend radially between fan case 132 and IMC 134. Core engine 120 may be secured to fan case 132 at IMC 134.

Figure 2A:
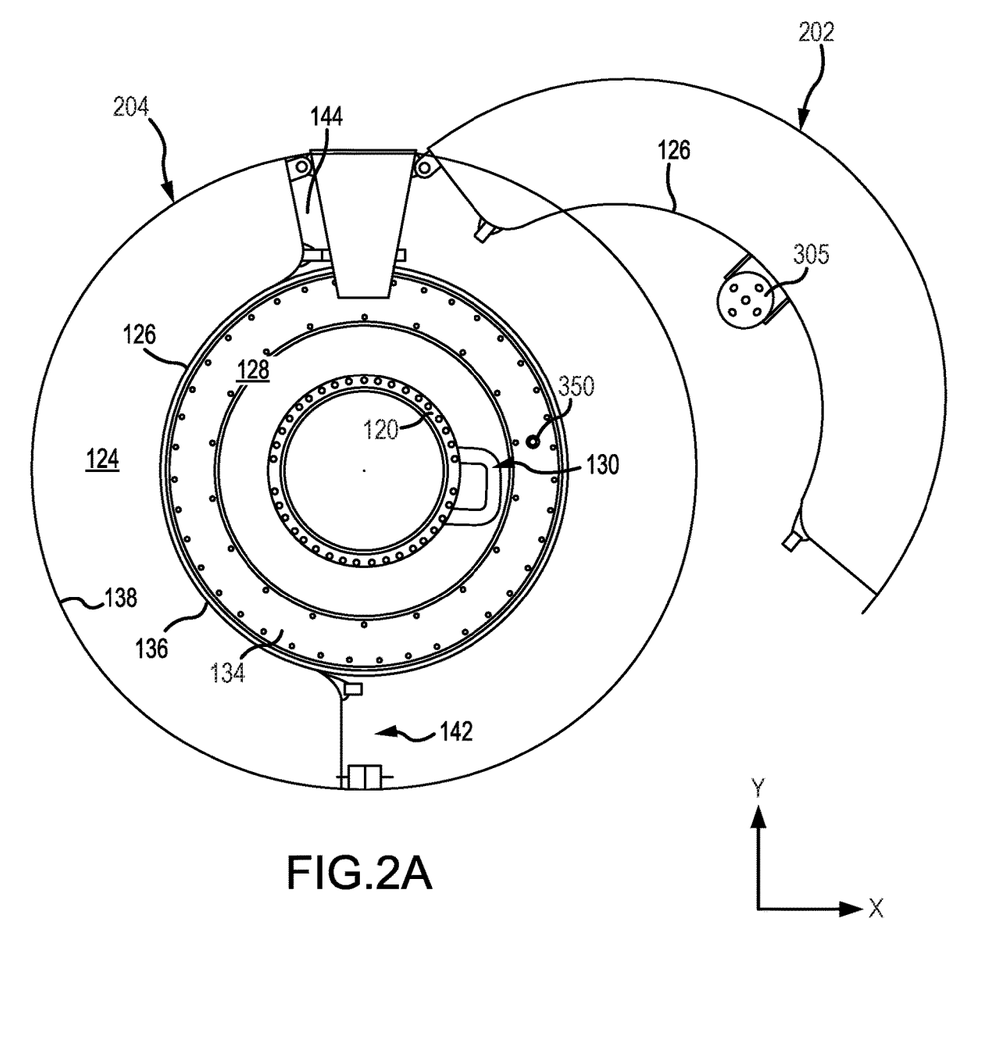
FIG. 2A illustrates a cross-sectional view of the gas turbine engine taken along line 2-2 in FIG. 1 with one of the halves open, in accordance with various embodiments.

According to various embodiments, FIG. 2A illustrates a sectional view of the gas turbine engine taken from approximately along line 2-2 in FIG. 1, with one half 202 in an open position and with the other half 204 in a closed position. In various embodiments, half 202 and half 204 may be thrust reverser halves. An upper bifurcation 144 and lower bifurcation 142 are the spaces between opposite upper and lower bifurcation panels of IFS 126 and may be used to accommodate the routing of engine components such as wires, air ducts, and gas conduits.

Inner fixed structure 126 surrounds core engine 120 and helps define core compartment 128. Various components may be provided in core compartment 128 such as compressed gas valves and/or compressed gas ducts, such as compressed duct 130 for example.

Figure 2B:
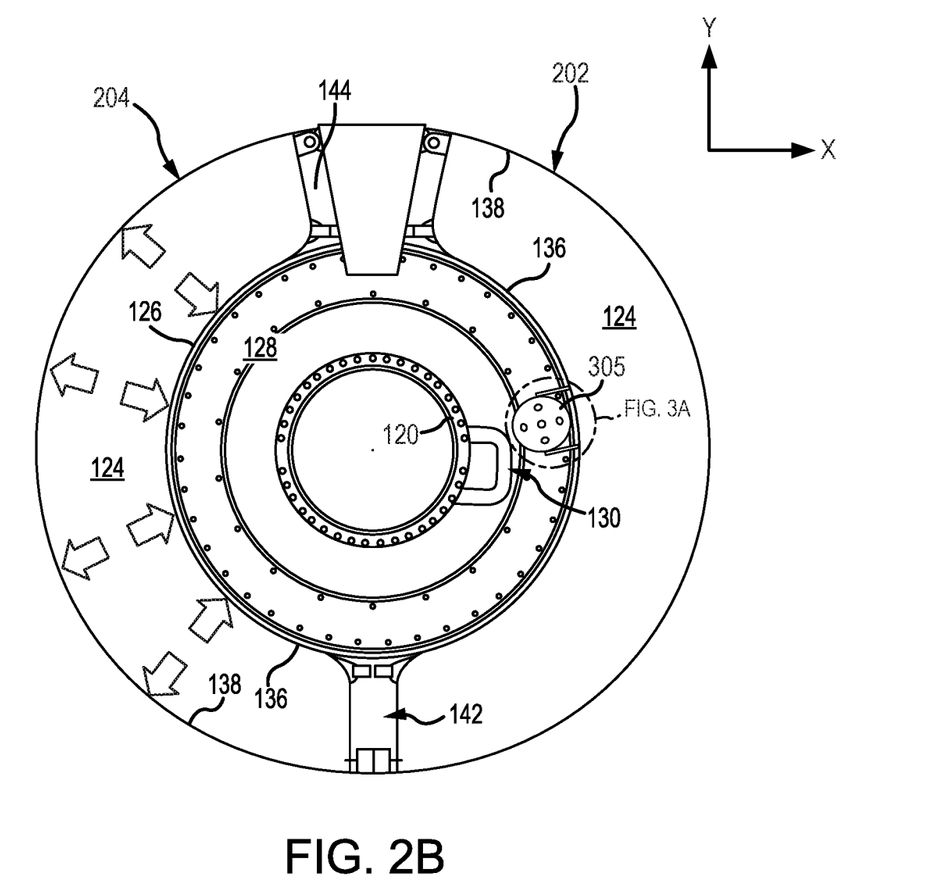
FIG. 2B illustrates a cross-sectional view of the gas turbine engine taken along line 2-2 in FIG. 1 and under normal operating conditions, in accordance with various embodiments.

According to various embodiments, FIG. 2B illustrates a cross-sectional view of the gas turbine engine taken from approximately along line 2-2 in FIG. 1 and under normal operating conditions, with both halves 202, 204 in the closed position. Typically, the bypass flow path 124 will exert radially outward pressure on the inner flow surface 136 and radially inward pressure on outer flow surface 138.

Figure 2C:
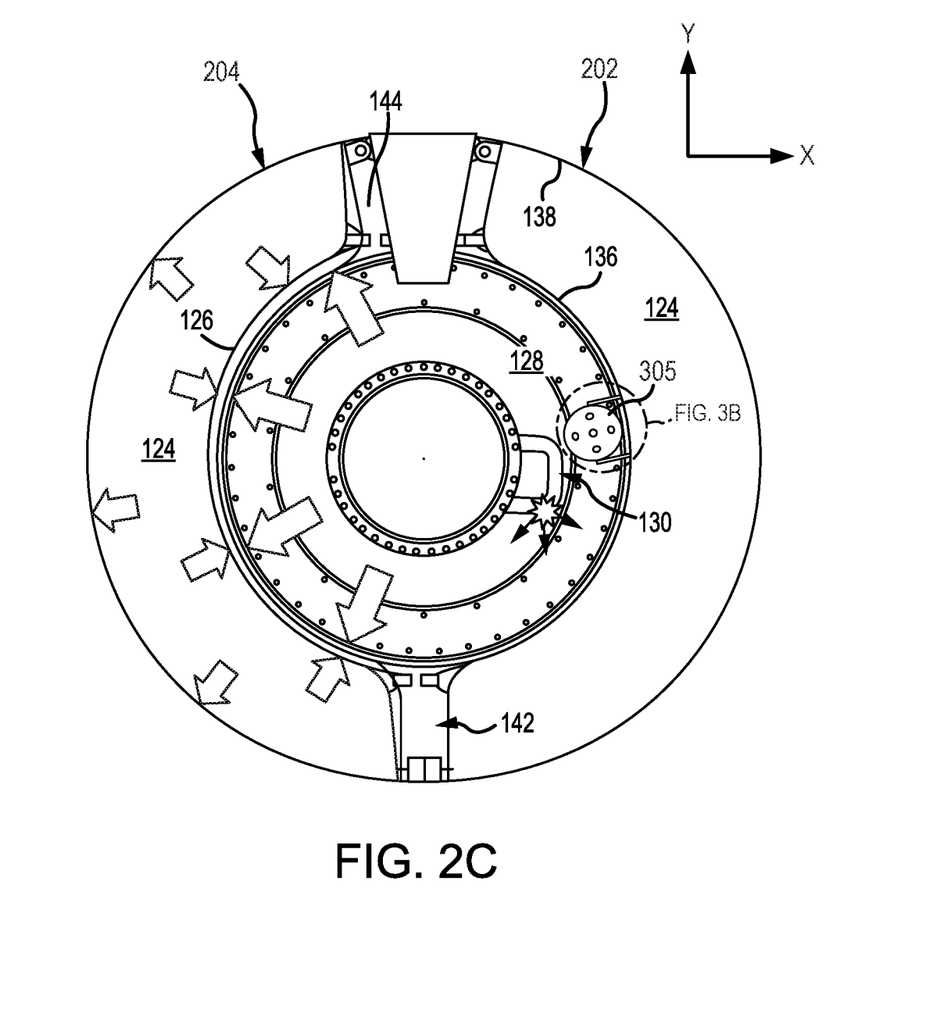
FIG. 2C illustrates a cross-sectional view of the gas turbine engine taken along line 2-2 in FIG. 1 and under an overpressure event, in accordance with various embodiments.

FIG. 2C illustrates a cross-sectional view of the gas turbine engine taken from approximately along line 2-2 in FIG. 1A and under an overpressure event with a portion of the IFS in a deflected state. From time to time, a core compartment 128 may experience more air pressure than it is typically designed to handle (i.e., an overpressure event), for example in the event that compressed duct 130 bursts. An overpressure event tends to exert a radially outward pressure upon the IFS 126. The pressure exerted radially outward upon the IFS 126 may be greater than the pressure exerted radially inward on the IFS from the bypass flow path 124. In response, a portion of the IFS 126 may deflect radially outwards. If the radially outward deflection of the leading edge of IFS 126 is too great, it will begin to scoop the high velocity air in the bypass flow path 124, which may cause even greater deflections of IFS 126 and a potential loss of structural integrity or permanent damage.

A diaphragm latch 305 is illustrated coupled to half 202 in FIG. 2A, FIG. 2B, and FIG. 2C for comparative purposes between half 202 and half 204. In this regard, diaphragm latch 305 prevents the IFS associated with half 202 from deflecting, as described with greater detail herein, while the IFS of half 204 deflects in response to an overpressure event. However, it is contemplated that a first diaphragm latch may be coupled to half 202 and a second diaphragm latch may be coupled to half 204 for preventing the IFS of both halves from deflecting.

Accordingly, latch assemblies between the leading edge of the IFS 126 and the IMC 134 may be provided to prevent the IFS 126 from deflecting relative to the IMC 134 in the event of an overpressure event (e.g., a burst duct). However, during normal operation, the IFS 126 and the IMC 134 may need to deflect relative to one another. Therefore, the latch assemblies should accommodate these deflections. The latch assemblies do not transfer mechanical load as a result of typical deflections between the IFS 126 and the IMC 134, and are in waiting-fail-safe mode to only take loads in the event of more severe deflections such as caused by a burst duct.

Figure 3A:
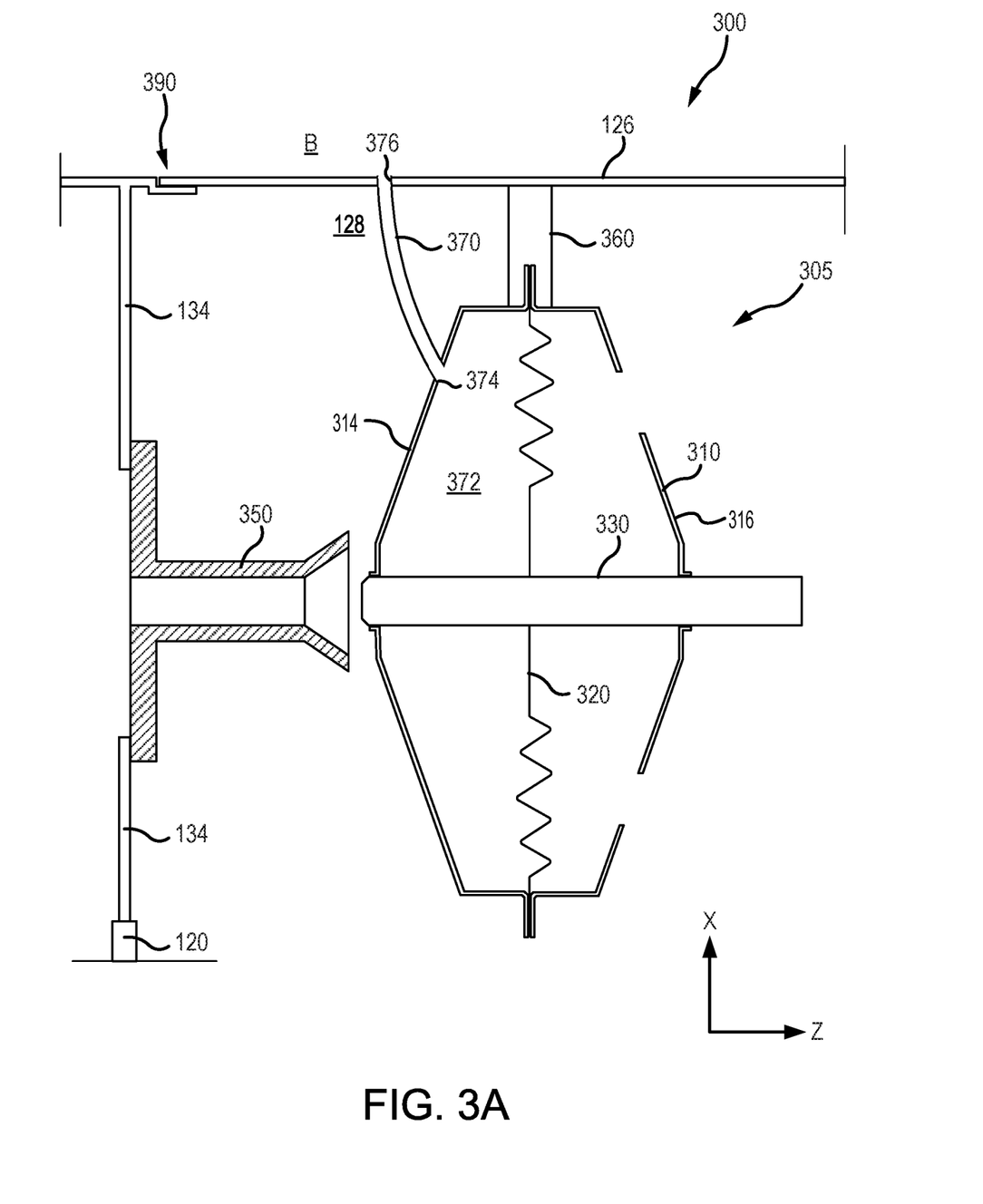
FIG. 3A, illustrates a cross-section view of a diaphragm latch arrangement in an unlatched position with a diaphragm latch in an inactivated state, in accordance with various embodiments.

With reference to FIG. 3A, a cross-section view of a latch arrangement 300 is illustrated, in accordance with various embodiments. Latch arrangement 300 may include a diaphragm latch 305 and a receptacle 350. Diaphragm latch 305 may be coupled to IFS 126. Diaphragm latch 305 may be disposed radially inward (negative X-direction) from IFS 126. Receptacle 350 may be coupled to IMC 134. Diaphragm latch 305 may be a passively activated, as described herein.

In various embodiments, diaphragm latch 305 may comprise a housing 310, a diaphragm 320, and a pin 330. Diaphragm 320 may be coupled to housing 310. Pin 330 may be coupled to diaphragm 320. Pin 330 may translate with respect to housing 310 in response to diaphragm 320 moving with respect to housing 310.

With combined reference to FIG. 2B and FIG. 3A, during normal operating conditions of the gas turbine engine, the leading edge 390 of IFS 126 may be seated against IMC 134. In this manner, bypass air flow B may be separated from core compartment 128. However, with combined reference to FIG. 2C and FIG. 3B, during an overpressure event, the leading edge 390 of IFS 126 may tend to deflect radially outwards (positive X-direction). In response to an overpressure event, a radially outward pressure may be exerted on IFS 126 and a pressure may be simultaneously exerted on diaphragm 320 (as depicted by the arrows in FIG. 3B). The pressure may be communicated from core compartment 128 onto diaphragm 320 via one or more openings 312 in housing 310. Diaphragm 320 may flex in response to the pressure being exerted onto diaphragm 320. Pin 330 may move with diaphragm 320 and extend from housing 310 in response to diaphragm 320 flexing. Pin 330 may be received by receptacle 350. Movement of IFS 126 with respect to IMC 134 may be mitigated in response to pin 330 being captured within receptacle 350. In this regard, diaphragm latch 305 may passively prevent leading edge 390 from radial deflection in response to an overpressure event within core compartment 128. Diaphragm latch 305 may return to equilibrium, as illustrated in FIG. 3A, in response to the pressure within core compartment 128 decreasing to normal conditions. In this regard, diaphragm latch 305 is passively operated, in accordance with various embodiments. In this regard, latch arrangement 300 provides a waiting-fail-safe load path between IFS 126 and IMC 134 to prevent IFS 126 from deflecting radially outwards.

In various embodiments, latch arrangement 300 may optionally include a tube 370 extending between diaphragm latch 305 and IFS 126. An opening (also referred to herein as a second opening) 374 may be disposed in a first side 314 of diaphragm latch 305 whereby a first end of tube 370 may be attached to diaphragm latch 305. Opening 374 may be similar to opening(s) 312 (see FIG. 4A) in second side 316. An opening 376 may be disposed in IFS 126 whereby a second end of tube 370 may be attached to IFS 126. Diaphragm latch 305 may be in fluidic communication with bypass air flow B via tube 370. In this regard, the pressure of a cavity 372 defined between housing 310 and diaphragm 320 may be equal to the pressure of bypass air flow B. Venting cavity 372 into bypass air flow B may facilitate movement of diaphragm 320. Stated differently, diaphragm 320 may move, thereby decreasing the volume of cavity 372, whereby air inside cavity 372 is vented into bypass air flow B via tube 370. In this regard, air may be moved from cavity 372 into bypass air flow B and/or from bypass air flow B into cavity 372, via tube 370, in response to diaphragm 320 moving with respect to housing 310. Tube 370 may be made from any suitable material, such as a metal or metal alloy, among others.

In various embodiments, diaphragm latch 305 may be coupled to IFS 126 via an attachment feature 360. Attachment feature 360 may extend between IFS 126 and housing 310 for securing diaphragm latch 305 to IFS 126. Attachment feature 360 is schematically illustrated in the drawings and may comprise any suitable feature for attaching housing 310 to IFS 126 such as, for example, a rod or a bracket, among others. Attachment feature 360 may include any number of fasteners such as, for example, a screw, a bolt, or a rivet, among others. In various embodiments, an adhesive, such as a glue or a resin may be used for attaching attachment feature 360 to IFS 126 and/or housing 310. In various embodiments, attachment feature 360 may be formed separately from housing 310. Stated differently, attachment feature 360 and housing 310 may comprise separate parts. In various embodiments, attachment feature 360 may be formed monolithically with housing 310. In various embodiments, attachment feature 360 may be formed monolithically with IFS 126. For example, IFS 126 and attachment feature 360 may comprise a single composite member. In various embodiments, attachment feature 360 may be made from any suitable material including a metal, a metal alloy, or a carbon composite, among others.

Figure 4A:
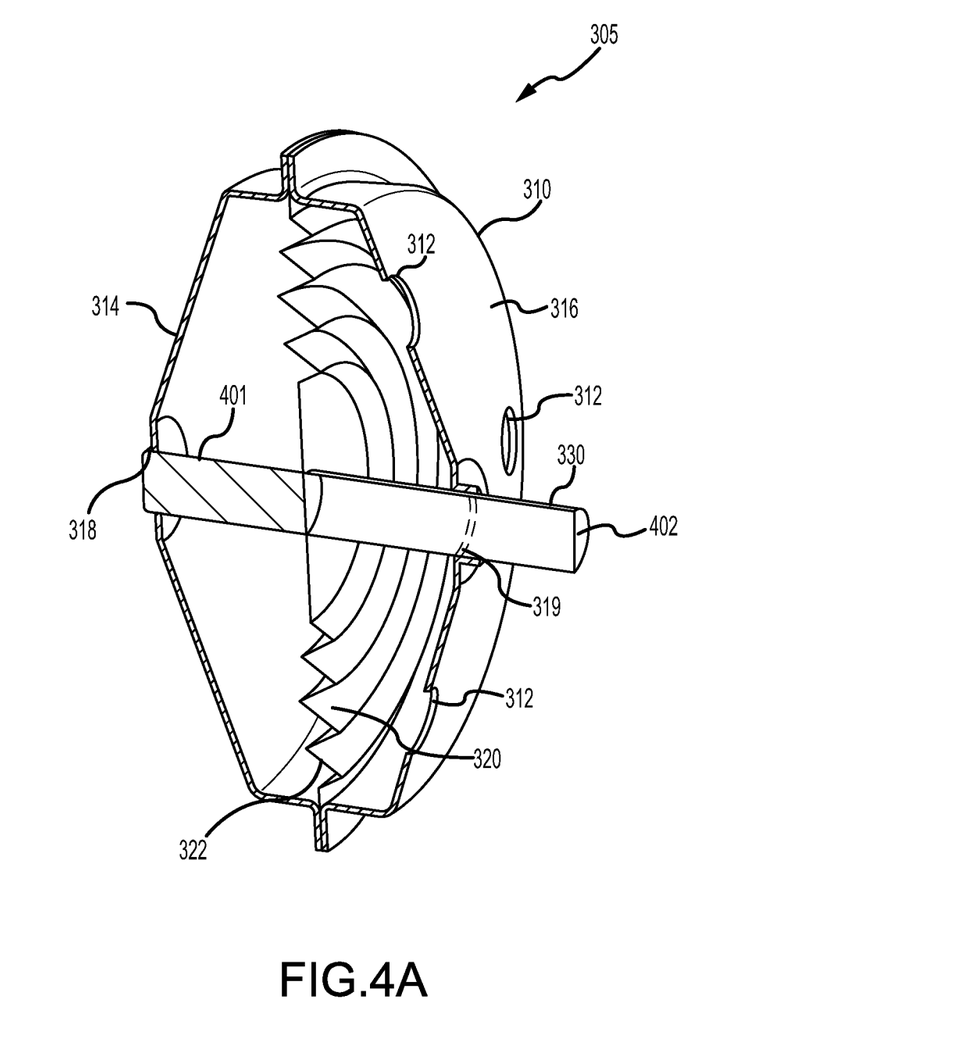
FIG. 4A illustrates an isometric sectional view of the diaphragm latch of FIG. 3A in an inactivated state, in accordance with various embodiments.

With reference to FIG. 4A, housing 310 may comprise a first side 314 and a second side 316. In various embodiments, diaphragm 320 may be coupled between first side 314 and a second side 316. An aperture (also referred to herein as a pin aperture or a first pin aperture) 318 may be disposed in housing 310. Pin aperture 318 may be disposed on first side 314. Opening 312 may be disposed on second side 316.

In various embodiments, pin 330 may comprise a first portion 401 extending from diaphragm 320 towards first side 314. First portion 401 may extend through pin aperture 318. Pin 330 may comprise a second portion 402 extending from diaphragm 320 towards second side 316. Second portion 402 may extend through a second pin aperture 319 disposed in second side 316. Pin aperture 318 and second pin aperture 319 may be in concentric alignment.

Figure 3B:
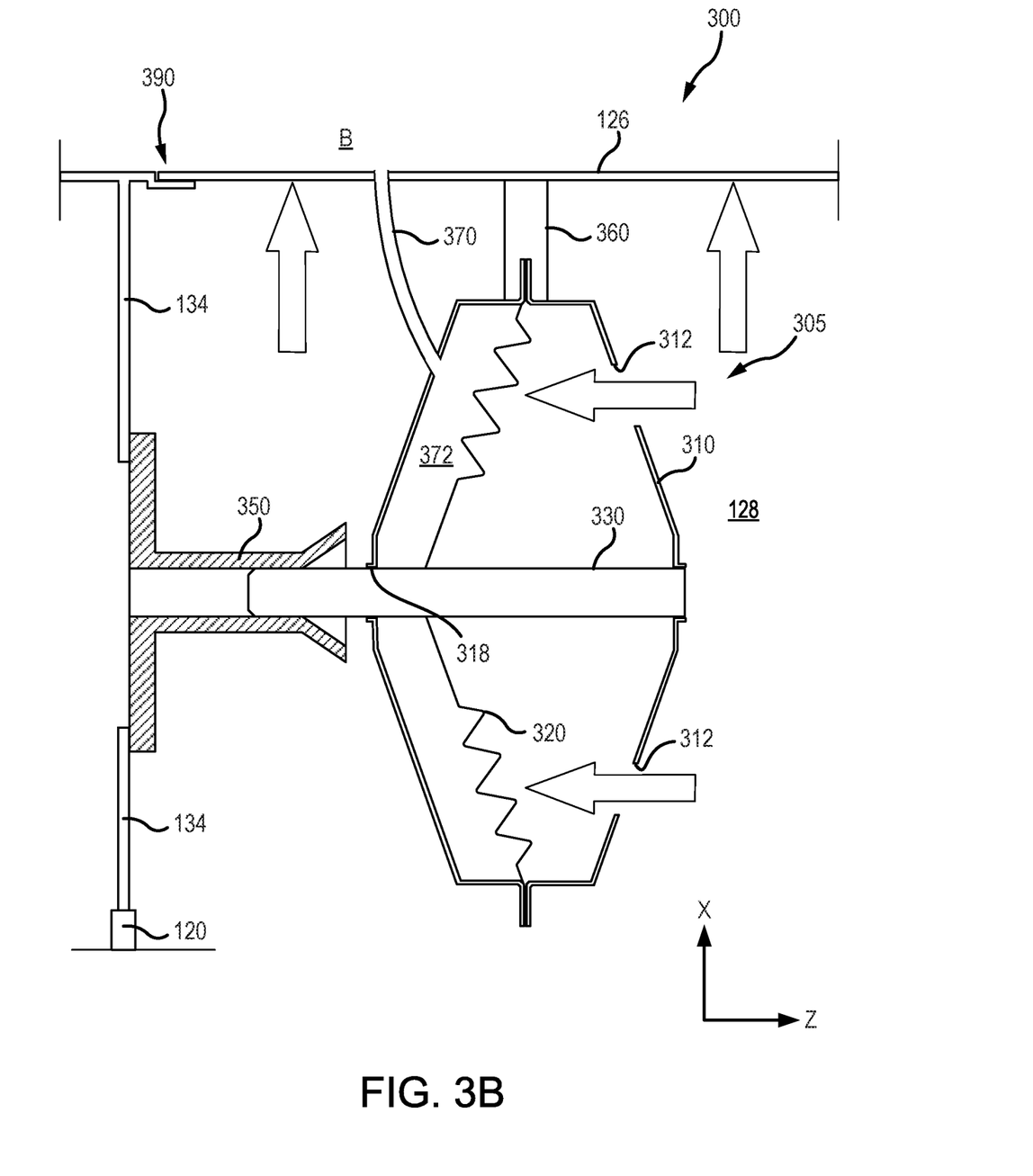
FIG. 3B, illustrates a cross-section view of a diaphragm latch arrangement in a latched position with a diaphragm latch in an activated state, in accordance with various embodiments.

In various embodiments, diaphragm 320 may flex towards first side 314, as illustrated in FIG. 3B, causing first portion 401 to extend from pin aperture 318 and second portion to retract into second pin aperture 319, in response to a pressure acting on diaphragm 320 via openings 312. In this regard, a pressure may be communicated through openings 312. Diaphragm 320 may return to equilibrium, as illustrated in FIG. 3A and FIG. 4A, causing first portion 401 to retract into pin aperture 318 and second portion to extend from second pin aperture 319, in response to the pressure acting on diaphragm 320 via openings 312 being decreased.

Figure 4B:
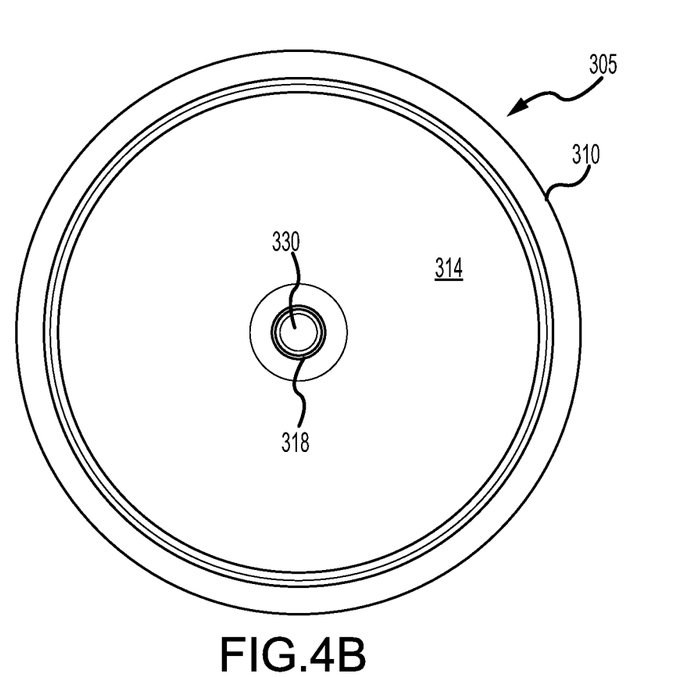
FIG. 4B illustrates a side view of the diaphragm latch of FIG. 4A depicting a first side of the diaphragm latch, in accordance with various embodiments.

With reference to FIG. 4B, a side view, looking at first side 314, is illustrated, in accordance with various embodiments. Housing 310 may comprise a circular geometry. Pin aperture 318 may be disposed in the center of housing 310.

Figure 4C:
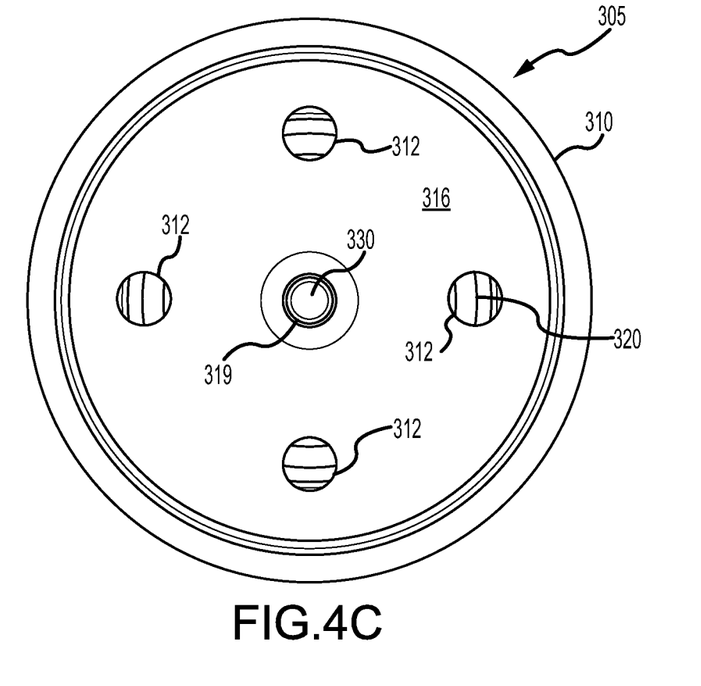
FIG. 4C illustrates a side view of the diaphragm latch of FIG. 4A depicting a second side of the diaphragm latch, in accordance with various embodiments.

With reference to FIG. 4C, a side view, looking at second side 316, is illustrated, in accordance with various embodiments. Second pin aperture 319 may be disposed in the center of housing 310. FIG. 4C illustrates four openings 312. However, it is contemplated that second side 316 may comprise any number of openings 312. For example, second side 316 may comprise one or more openings 312.

In various embodiments, diaphragm latch 305 may be round. However, a cross-sectional profile of diaphragm latch 305, taken perpendicular to the direction of motion of pin 330 (i.e., perpendicular to the Z-direction with momentary reference to FIG. 3B), may be any suitable geometry, including round, elliptic, or polygonal, among others.

In various embodiments, housing 310 may be made from a metal, such as steel, among others. In various embodiments, diaphragm 320 may be made from a metal, such as steel, among others. In various embodiments, pin 330 may be made from a metal, such as steel, among others. Pin 330 may be polished to facilitate relative movement with respect to housing 310. Pin 330 may be comprise a coating to facilitate relative movement with respect to housing 310.

In various embodiments, housing 310 may be manufactured using hydroforming, casting, additive manufacturing, negative manufacturing, and/or pressing processes, among others. In various embodiments, diaphragm 320 may be manufactured using hydroforming, casting, negative manufacturing, and/or pressing processes, among others.

In various embodiments, first side 314 may be coupled to second side 316 by soldering, brazing, or welding first side 314 to second side 316 at the outer periphery of diaphragm latch 305. In various embodiments, first side 314 may be coupled to second side 316 using a fastener, such as a bolt or a rivet for example. In various embodiments, first side 314 may be coupled to second side 316 using an adhesive or glue. In various embodiments, diaphragm 320 may be compressed between first side 314 and second side 316 at the outer periphery of diaphragm 320. In this regard, the outer periphery of diaphragm 320 may be fixed to housing 310. Diaphragm 320 may comprise a plurality of pleats 322 (see FIG. 4A) extending circumferentially around diaphragm 320.

Figure 5:
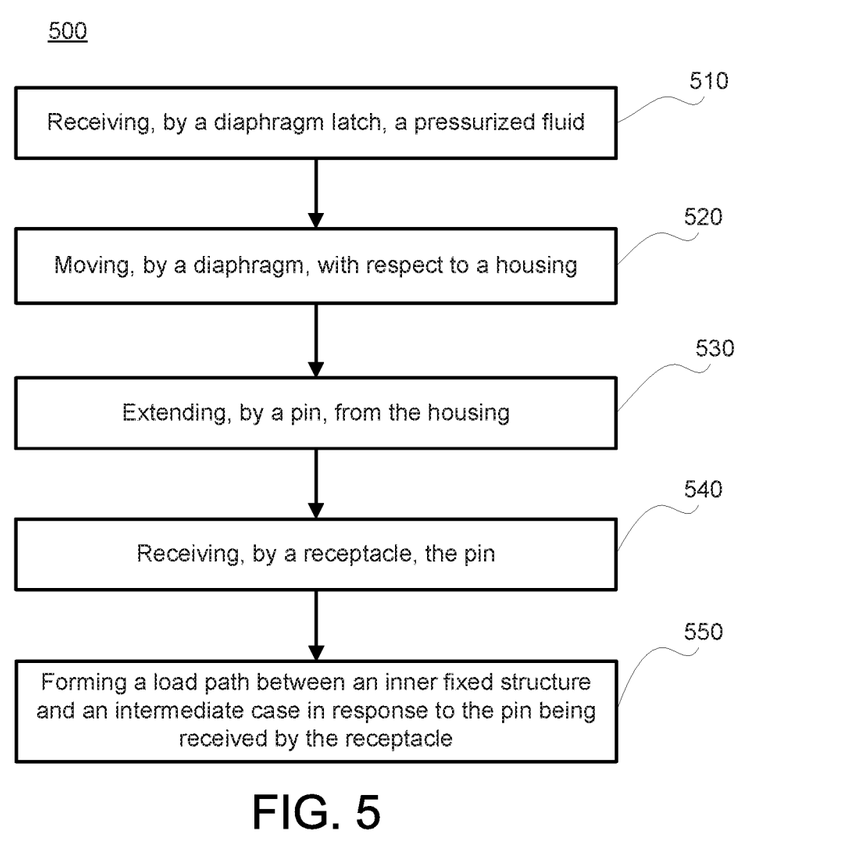
FIG. 5 illustrates a flow chart of a method for passively coupling an IFS to an IMC during an overpressure event, in accordance with various embodiments.

With reference to FIG. 5, a flow chart depicting a method 500 for passively coupling an IFS to an IMC during an overpressure event is illustrated, in accordance with various embodiments. Method 500 includes receiving, by a diaphragm latch, a pressurized gas (step 510). Method 500 includes moving, by a diaphragm, with respect to a housing (step 520). Method 500 includes extending, by a pin, from the housing (step 530). Method 500 includes receiving, by a receptacle, the pin (step 540). Method 500 includes forming a load path between the IFS and the IMC in response to the pin being received by the receptacle (step 550).

With combined reference to FIG. 3A, FIG. 3B, and FIG. 5, step 510 may include receiving, by diaphragm latch 305, a pressurized gas (illustrated by arrows in FIG. 3B) from core compartment 128. For example, duct 130, with momentary reference to FIG. 3C, may burst, releasing the pressurized gas into core compartment 128. Step 520 may include moving, by diaphragm 320, with respect to housing 310 in response to the pressurized gas being received. For example, diaphragm 320 may be forced towards first side 314, with momentary reference to FIG. 4A. Diaphragm 320 may flex as it moves towards first side 314. Step 530 may include extending, by pin 330, from housing 310 in response to diaphragm 320 moving. Pin 330 may extend from pin aperture 318. Step 540 may include receiving, by receptacle 350, pin 330 in response to pin 330 extending from housing 310. In this regard, receptacle 350 may be in concentric alignment with pin aperture 318. Step 550 may include forming a load path (e.g., from IFS 126, through attachment feature 360, housing 310, pin 330, receptacle 350, and into IMC 134) between IFS 126 and IMC 134 in response to pin 330 being received by receptacle 350. In this regard, receptacle 350 may physically resist movement of pin 330 relative to receptacle 350, mitigating movement of IFS 126.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A method for passively coupling an inner fixed structure to an intermediate case during an overpressure event, the method comprising:
    directing a pressurized gas from a core compartment into a diaphragm latch, wherein the diaphragm latch is disposed in the core compartment, and the pressurized gas is exerted onto the inner fixed structure comprising a leading edge disposed radially with respect to the intermediate case;
    moving a diaphragm of the diaphragm latch with respect to a housing of the diaphragm latch in response to the pressurized gas being directed into the diaphragm latch;
    extending a pin of the diaphragm latch from the housing in response to the movement of the diaphragm; and
    directing the pin into a receptacle in response to the pin extending from the housing, wherein the receptacle is disposed in the core compartment.

2. The method of claim 1, further comprising forming a load path between the inner fixed structure and the intermediate case in response to the pin being received by the receptacle.

3. The method of claim 1, wherein the diaphragm is coupled to the housing and the pin is coupled to the diaphragm so as to move with the diaphragm.

4. A latch arrangement, comprising:
    a receptacle coupled to an intermediate case; and
    a diaphragm latch coupled to an inner fixed structure, wherein the inner fixed structure comprises a leading edge configured to seat against the intermediate case, the leading edge disposed radially outward from the intermediate case, the inner fixed structure surrounds a core compartment, and the diaphragm latch and the receptacle are disposed in the core compartment; and
    the diaphragm latch comprises:
        a housing comprising a first side and a second side;
        at least one opening disposed in the second side of the housing;
        a diaphragm disposed in the housing, wherein the first side is disposed opposite the diaphragm from the second side;
        a pin coupled to the diaphragm; and
        a pin aperture disposed in the first side of the housing, wherein the pin extends from the pin aperture;
        wherein the diaphragm is configured to flex in response to a pressure in the core compartment being communicated through the at least one opening, wherein the pressure is exerted radially outward on the inner fixed structure;
        the pin is configured to extend from the pin aperture in response to the diaphragm flexing so as to secure the leading edge from radial deflection with respect to the intermediate case.

5. The latch arrangement of claim 4, wherein the diaphragm latch is disposed radially inwards from the inner fixed structure.

6. The latch arrangement of claim 5, wherein the diaphragm is coupled to the leading edge of the inner fixed structure.

7. The latch arrangement of claim 6, wherein the pin is received by the receptacle in response to the pin extending from the pin aperture so as to secure the leading edge from radial deflection with respect to the intermediate case.

8. The latch arrangement of claim 4, wherein the diaphragm is configured to flex in response to the pressure of the core compartment increasing.

9. The latch arrangement of claim 8, wherein the diaphragm is configured to flex towards the first side of the housing in response to the pressure of the core compartment increasing, thereby extending the pin from the pin aperture, and the diaphragm is configured to flex towards the second side of the housing in response to the pressure of the core compartment decreasing, thereby retracting the pin from the pin aperture.

10. The latch arrangement of claim 9, further comprising a tube extending between the inner fixed structure and the diaphragm latch, whereby the diaphragm latch is in fluidic communication with a bypass flow path.

11. The latch arrangement of claim 4, further comprising a second opening disposed in the first side of the housing.

12. The latch arrangement of claim 11, wherein the second opening is in fluidic communication with a bypass flow path disposed opposite the inner fixed structure from the core compartment.

* * * * *